US009832938B2

(12) United States Patent
Park

(10) Patent No.: US 9,832,938 B2
(45) Date of Patent: Dec. 5, 2017

(54) APPARATUS FOR MASS CULTIVATION OF PLANTS

(71) Applicants: Green Plus Co.,Ltd., Chungcheongnam-do (KR); Agricultural Corporation Safefood Company Co.,Ltd., Chungcheongnam-do (KR)

(72) Inventor: Yeong Hwan Park, Pyeongtaek-si (KR)

(73) Assignees: GREEN PLUS CO., LTD., Yesan (KR); GREEN K-FARM AGRICULTURAL CO., LTD., Pyeongtaek (KR)

( * ) Notice: Subject to any disclaimer, the term of this patent is extended or adjusted under 35 U.S.C. 154(b) by 139 days.

(21) Appl. No.: 14/438,105

(22) PCT Filed: Mar. 11, 2013

(86) PCT No.: PCT/KR2013/001937
§ 371 (c)(1),
(2) Date: Apr. 23, 2015

(87) PCT Pub. No.: WO2014/065476
PCT Pub. Date: May 1, 2014

(65) Prior Publication Data
US 2015/0319936 A1 Nov. 12, 2015

(30) Foreign Application Priority Data
Oct. 25, 2012 (KR) ........................ 10-2012-0118774

(51) Int. Cl.
*A01G 9/14* (2006.01)
*A01G 9/02* (2006.01)
(Continued)

(52) U.S. Cl.
CPC ................. *A01G 9/14* (2013.01); *A01G 9/02* (2013.01); *A01G 31/02* (2013.01); *A01G 31/06* (2013.01); *Y02P 60/216* (2015.11)

(58) Field of Classification Search
CPC ... A01G 9/14; A01G 9/00; A01G 9/02; A01G 9/023; A01G 9/024; A01G 9/143; A01G 9/1476; A01G 31/02
See application file for complete search history.

(56) References Cited

U.S. PATENT DOCUMENTS

2003/0223850 A1* 12/2003 Hendriks ............... A01G 9/143
414/626

FOREIGN PATENT DOCUMENTS

JP 10-215701 A 8/1998
JP 2001-231374 A 8/2001
(Continued)

*Primary Examiner* — Monica Williams
*Assistant Examiner* — Jessica Wong
(74) *Attorney, Agent, or Firm* — STIP Law Group, LLC

(57) ABSTRACT

The present invention relates to an apparatus for mass cultivation of plants, which enables plants to be cultivated in the entire area of a greenhouse when the plants are cultivated in the greenhouse, thus enabling mass production of plants. The apparatus for mass cultivation of plants according to one embodiment of the present invention, comprises: a driving means installed in the truss, which horizontally crosses the upper portion of the greenhouse; a movable member arranged below the truss such that the moving direction of the movable member changes according to the driving direction of the driving means; multiple elevating members arranged at predetermined spaces beneath the truss such that a right part of the elevating member descends when a left part of the elevating member ascends and the right part of the elevating member ascends when the left part of the elevating member descends according to the moving direc- (Continued)

tion of the movable member; and multiple cultivation gutters hanging from the respective left ends and right ends of the elevating members.

10 Claims, 17 Drawing Sheets

(51) Int. Cl.
*A01G 31/06* (2006.01)
*A01G 31/02* (2006.01)

(56) References Cited

FOREIGN PATENT DOCUMENTS

| JP | 2002-034337 A | | 2/2002 |
|---|---|---|---|
| JP | 2005013047 | * | 1/2005 |
| KR | 10-2012-0049582 A | | 5/2012 |

* cited by examiner

APPARATUS FOR MASS CULTIVATION OF PLANTS

TECHNICAL FIELD

The present invention relates to an apparatus for mass cultivation of plants, which enables plants to be cultivated in the entire area of a greenhouse when the plants are cultivated in the greenhouse, thus enabling mass production of plants.

BACKGROUND ART

In general, when doing soil cultivation or water cultivation, since at least half of the area of a greenhouse is necessary for a passage of workers during seeding, cultivation work or harvest, it is problematic that the area of cultivation reduces in half due to the presence of the passage area, thus greatly reducing the productivity per area of the greenhouse, for which producing cost as well as customer price increase, so both producers and customers may have increased cost burden.

Therefore, in order to enhance the use efficiency of the cultivation area in the related art, multiple cultivation containers hang in turn in a horizontal direction from a girder of the greenhouse so that the multiple cultivation containers can alternately ascend or descend with the aid of a support device and first and second elevating devices, whereby the cultivation containers can alternately ascend or descend one by one when the first or second elevating device operates, thus forming a work passage between the ascended and descended cultivation containers (the Japanese Patent Publication No. 2002-034337).

However, the above-described plant cultivation apparatus includes first and second elevating devices which are configured to alternately ascend or descend one by one the cultivation containers and include a driving motor, a driving shaft for transferring the driving force of the driving motor, and a sprocket. At the other end of the chain which hangs around its one end a support device, a counterweight selected inconsideration of the weight of the cultivation container loaded on the support device is engaged, thus allowing a smooth elevation work of the support device, for which the entire structure may become complicated, and manufacturing and installation cost a lot, and maintenance becomes very hard.

DISCLOSURE OF INVENTION

Technical Problem

Accordingly, the present invention is made in an effort to resolve the problems in the conventional art. It is an object of the present invention to provide an apparatus for mass cultivation of plants by which the productivity per greenhouse may become double.

It is another object of the present invention to provide an apparatus for mass cultivation of plants, which makes it possible to alleviate producer's and customer's cost-related burdens.

Solution to Problem

To achieve the above objects, there is provided an apparatus for mass cultivation of plants wherein there are provided a driving unit installed at a truss horizontally crossing the tops of pillars of a greenhouse, a moving member which is installed movable in left and right directions by the driving unit, a plurality of elevating members which are installed to ascend or descend in response to the leftward and rightward movements of the moving member, and a plurality of cultivation gutters which are installed, hanging from the elevating members. In the normal time, a plurality of the cultivation gutters hang horizontally at regular intervals and at predetermined heights from the ground, and when workers needs to move for the sake of seeding, cultivation work or harvest, the driving unit is driven, and the moving member is moved leftward or rightward, and a plurality of the elevating members alternately ascend or descend, and then one elevating member descends, so a plurality of the cultivation gutters hanging from each elevating member alternately ascend or descend one by one, thus forming, between the descended cultivation gutters, a passage through which workers can walk, with the aid of the ascended cultivation gutters, thus using the entire area of the greenhouse as the cultivation area, thus doubling the productivity.

Advantageous Effects

According to the apparatus for mass cultivation of plants according to an exemplary embodiment of the present invention, it is characterized by using the entire area of a greenhouse as the cultivation area, so the productivity per greenhouse may be double, and any factors for the risings of a production expense and customer prices can be eliminated, thus obtaining economical effects, for example, greatly saving the cost-related burden to the producers and customers.

BEST MODES FOR CARRYING OUT THE INVENTION

The present invention relates to an apparatus for mass cultivation of plants, which enables plants to be cultivated in the entire area of a greenhouse when the plants are cultivated in the greenhouse, thus enabling mass production of plants.

MODES FOR CARRYING OUT THE INVENTION

Hereinafter, the apparatus for mass cultivation of plants according to an exemplary embodiment of the present invention will be described with reference to the accompanying drawings.

Figure 1:
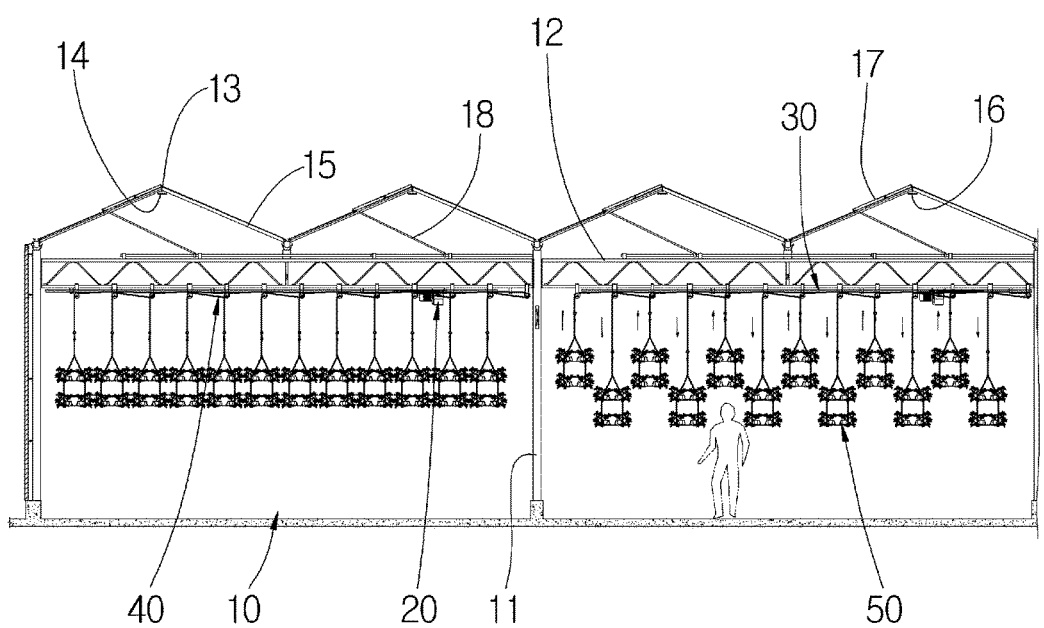
FIG. 1 is a schematic front view illustrating a greenhouse wherein an apparatus for mass cultivation of plants according to a first exemplary embodiment of the present invention is installed.
Figure 2:
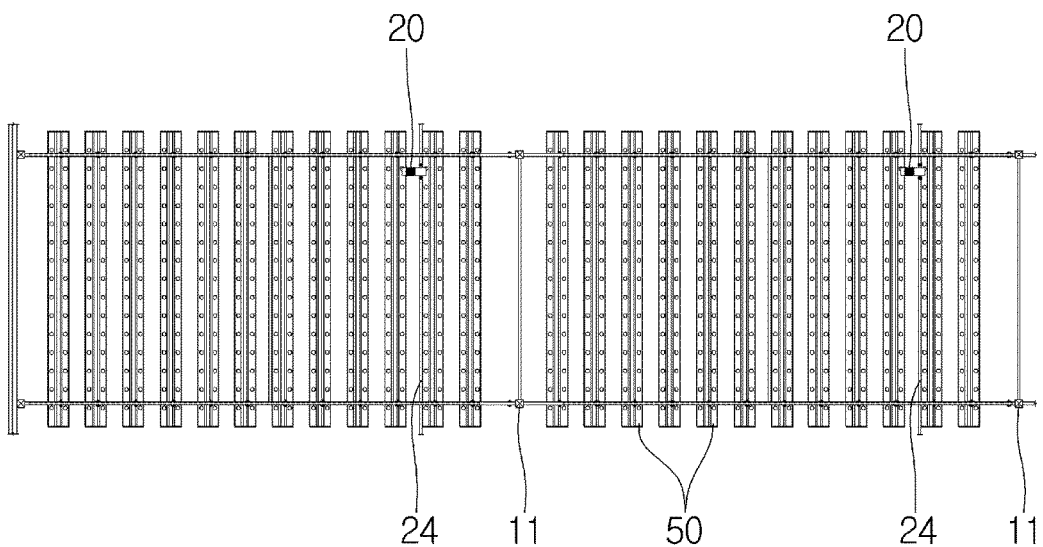
FIG. 2 is a schematic plane view illustrating an extracted state of an apparatus for mass cultivation of plants in FIG. 1.

FIG. 1 is a schematic front view illustrating a greenhouse wherein an apparatus for mass cultivation of plants according to a first exemplary embodiment of the present invention is installed. FIG. 2 is a schematic plane view illustrating an extracted state of an apparatus for mass cultivation of plants in FIG. 1.

The apparatus for mass cultivation of plants according to a first exemplary embodiment of the present invention may include a driving unit 20 which is installed at a truss 12 horizontally crossing the tops of pillars 11 of a greenhouse 10, a moving member 30 which is installed horizontally crossing in left and right directions at the bottom of the truss and can move leftward or rightward by the driving unit, a plurality of elevating members 40 which can ascend or descend in response to the leftward and rightward movements of the moving member, and a plurality of cultivation gutters 50 which are disposed, hanging from the elevating member.

The greenhouse 10 may include a roof structure which is formed of a ridge 14 which is installed in a horizontal direction at the top in the center of the truss 12 and has at its top a ceiling hinge 13 disposed in a horizontal direction, wherein holes are formed at regular intervals at its side surface, a plurality of rafter pipes 15 which are installed in a triangle shape wherein its intermediate portion is inserted in the holes and is slanted downward in both directions, an opening unit 16 which is formed long in a horizontal direction at both sides of the ridge by engaging inner and outer coating materials to the respective tops of the outer surface and the inner surface of both side portions except for the top of one side of the rafter pipes, while forming an air layer in the inside space, a cover 17 for opening and closing the opening unit since each top is engaged rotatable to the ceiling hinge, and an open pusher 18 which is installed rotatable by the driving of the motor, thus rotating the cover.

Of course, since the above-described roof structure of the greenhouse 10 has been used widely, it may be directly used, so the detailed description thereof will be omitted.

Figure 3A:
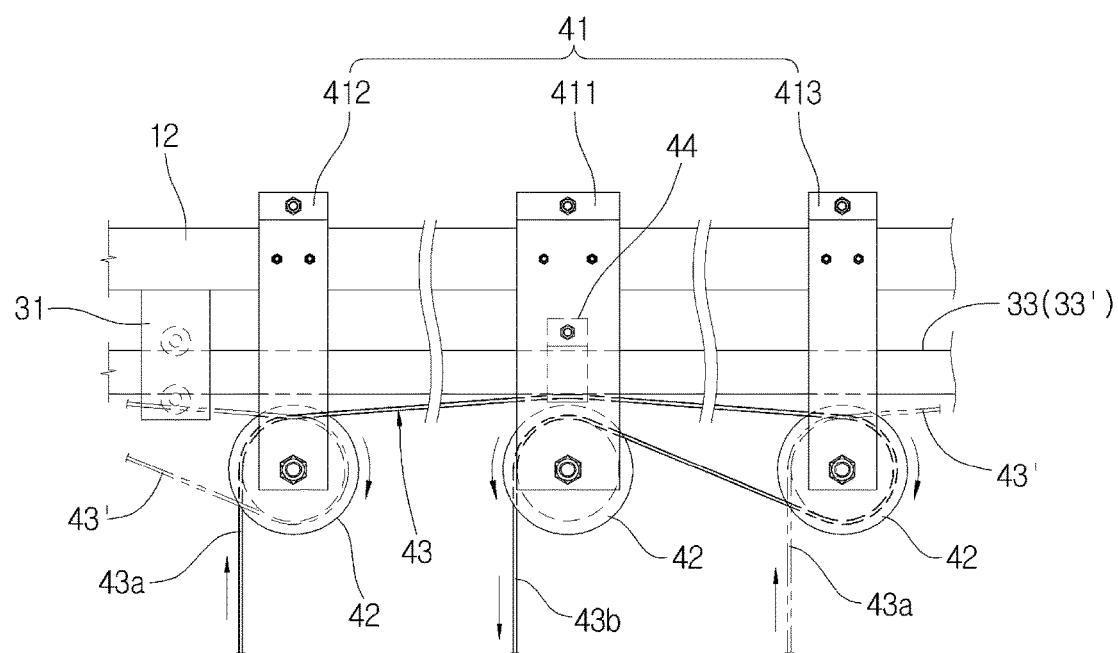
FIG. 3A is a front view illustrating a partially extracted and enlarged state of a movement member and an elevating member in FIG. 1.
Figure 3B:
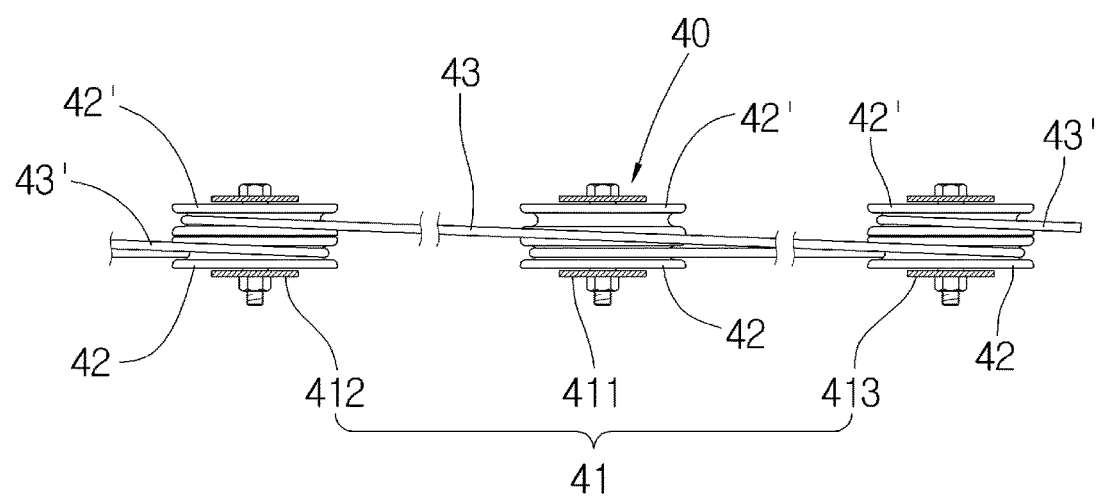
FIG. 3B is a plane view illustrating a partially extracted state of an elevating member in FIG. 3A.
Figure 3C:
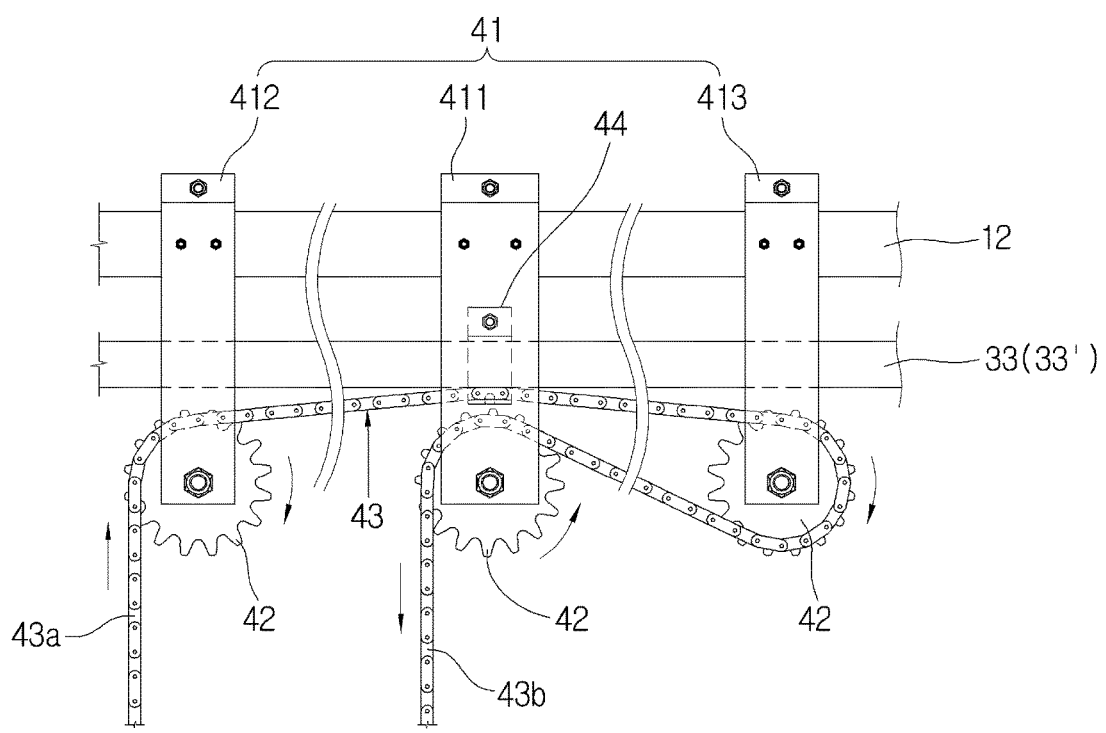
FIG. 3C is a front view illustrating a variant example of an elevating member which applies to an apparatus for mass cultivation of plants in FIG. 1.
Figure 4:
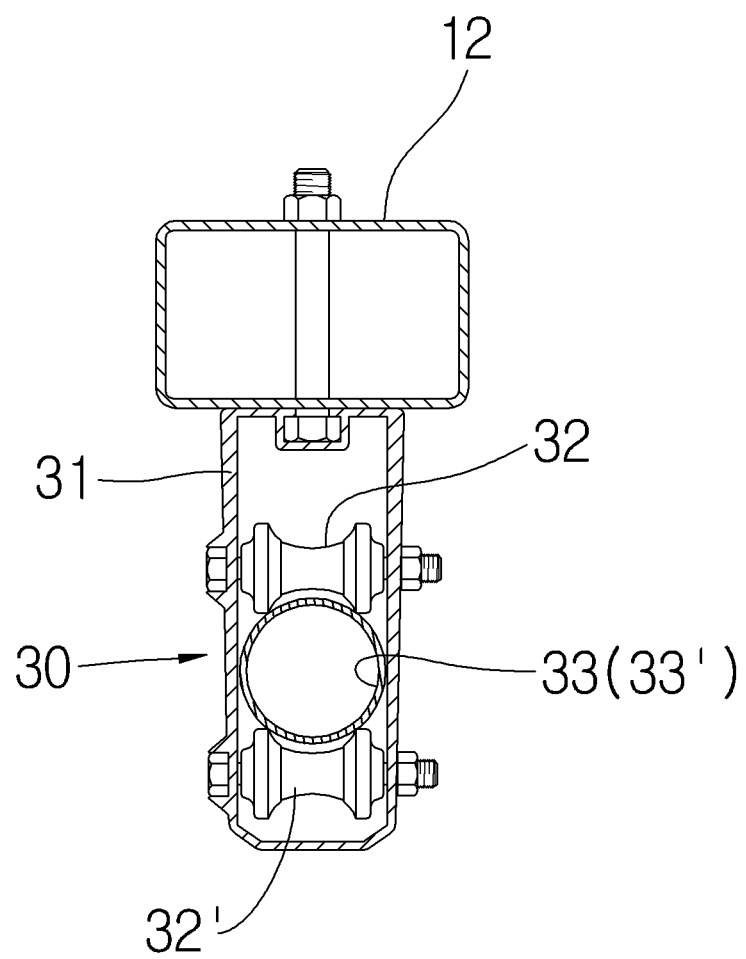
FIG. 4 is a side cross sectional view illustrating a partially extracted and enlarged state of a movement member in FIG. 3A.
Figure 5:
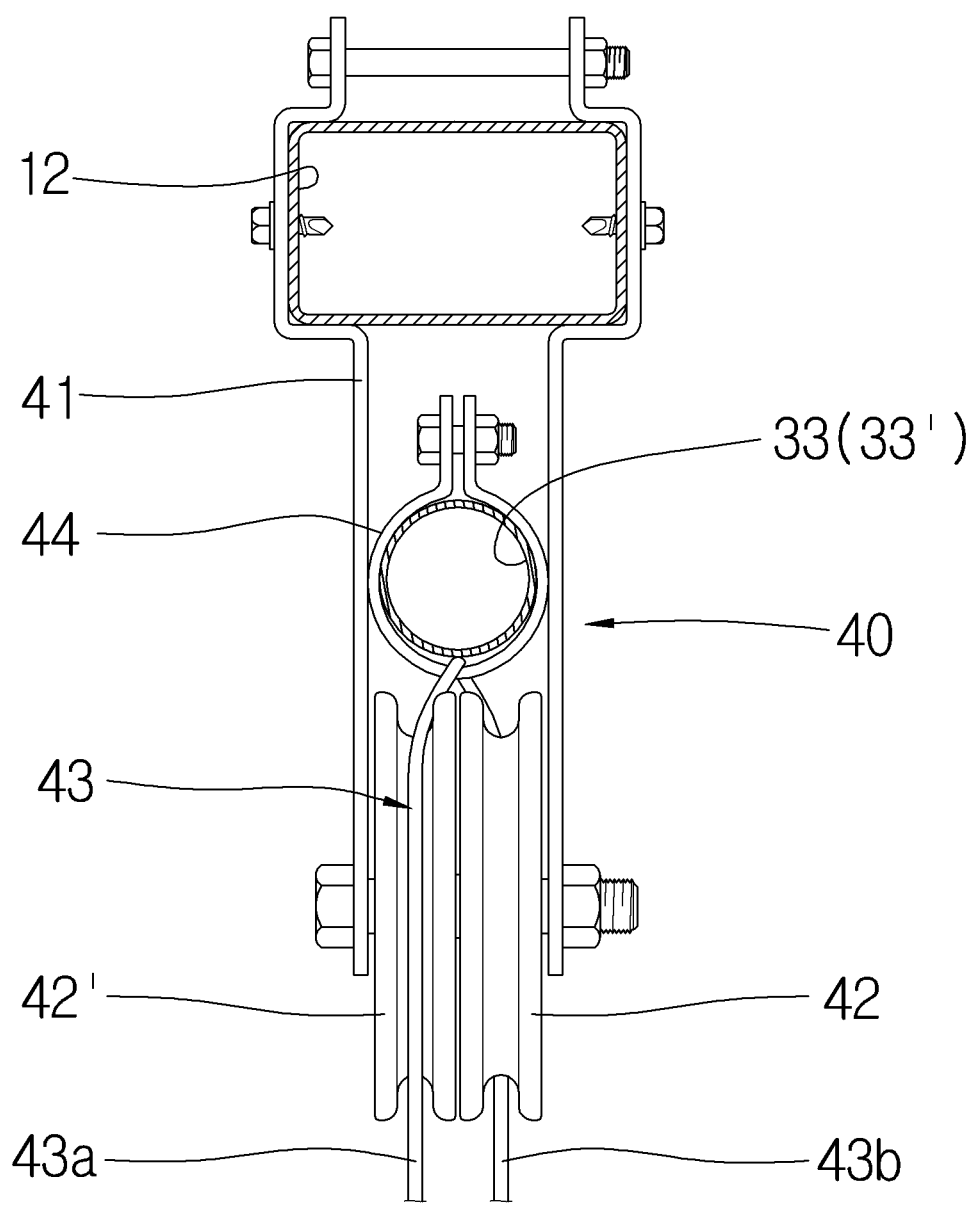
FIG. 5 is a side view illustrating a partially extracted and enlarged state of an elevating member in FIG. 3A.
Figure 6A:
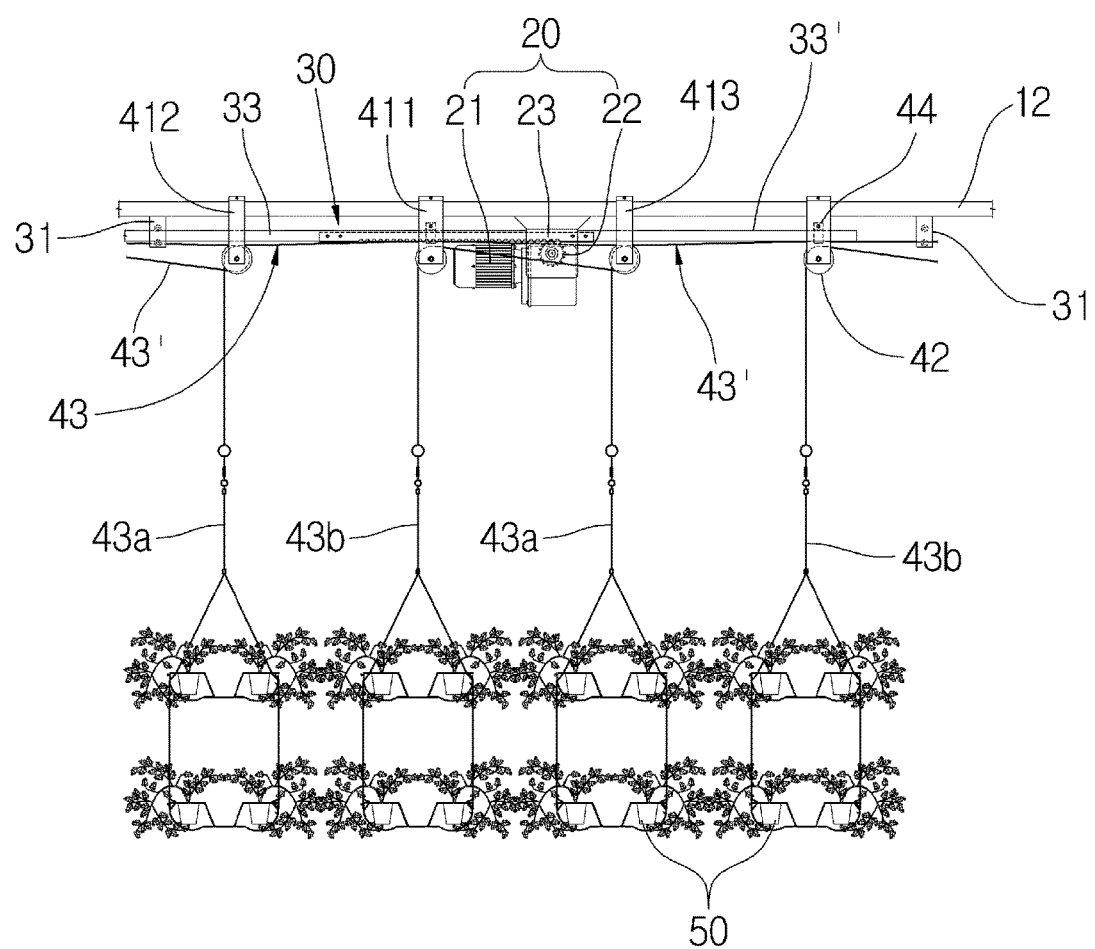
FIG. 6A is a front view illustrating a partially extracted and enlarged state where a cultivation gutter is in a horizontal state in FIG. 1.
Figure 6B:
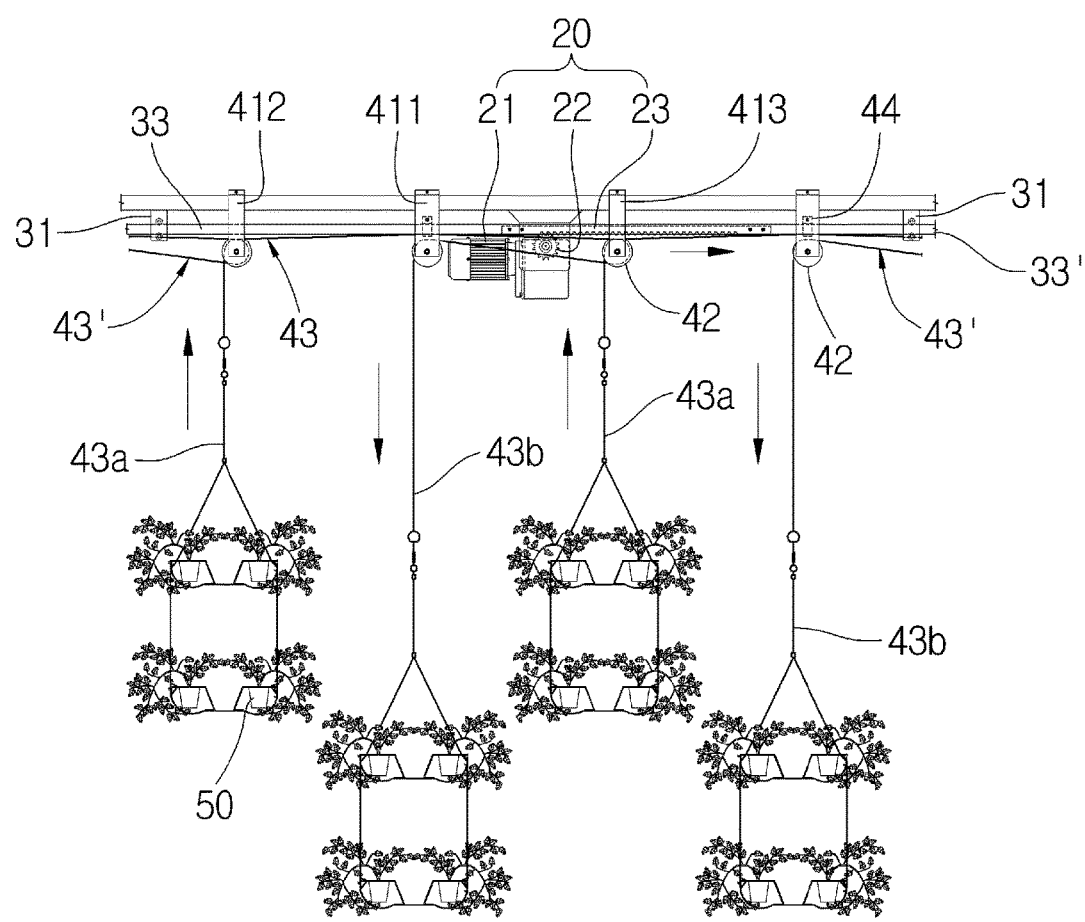
FIG. 6B is a front view illustrating a partially extracted and enlarged state where a cultivation gutter has alternately ascended and descended in FIG. 1.
Figure 7A:
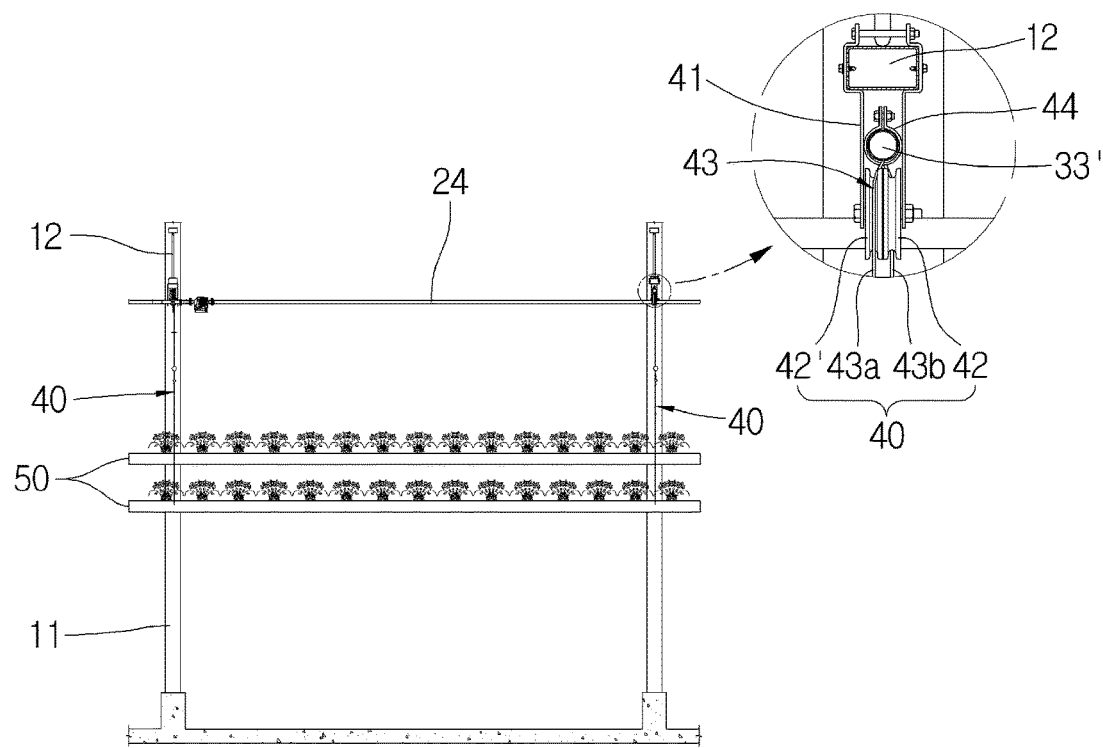
FIG. 7A is a side view illustrating a partially extracted and enlarged state when a cultivation gutter is in a horizontal state in FIG. 1.
Figure 7B:
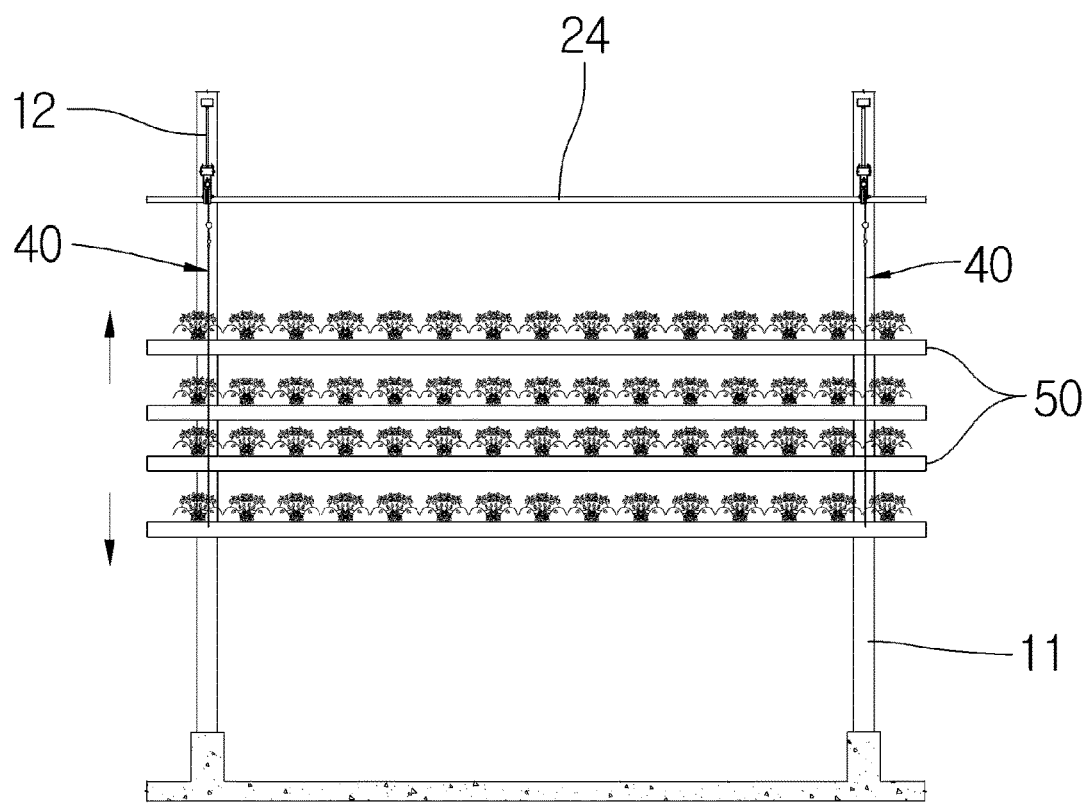
FIG. 7B is a side view illustrating a partially extracted and enlarged state when a cultivation gutter has alternately ascended and descended in FIG. 1.

FIG. 3A is a front view illustrating a partially extracted and enlarged state of a movement member and an elevating member in FIG. 1. FIG. 3B is a plane view illustrating a partially extracted state of an elevating member in FIG. 3A. FIG. 3 is a front view illustrating a variant example of an elevating member which applies to an apparatus for mass cultivation of plants in FIG. 1. FIG. 4 is a side cross sectional view illustrating a partially extracted and enlarged state of a movement member in FIG. 3A. FIG. 5 is a side view illustrating a partially extracted and enlarged state of an elevating member in FIG. 3A. FIG. 6A is a front view illustrating a partially extracted and enlarged state where a cultivation gutter is in a horizontal state in FIG. 1. FIG. 6B is a front view illustrating a partially extracted and enlarged state where a cultivation gutter has alternately ascended and descended in FIG. 1. FIG. 7A is a side view illustrating a partially extracted and enlarged state when a cultivation gutter is in a horizontal state in FIG. 1. FIG. 7B is a side view illustrating a partially extracted and enlarged state when a cultivation gutter has alternately ascended and descended in FIG. 1.

The driving unit 20 may include a deceleration motor 21, a pinion 22 and a rack 23, and a driving pipe 24.

The deceleration motor 21 may be fixedly installed at the truss 12, and the pinion 22 may be installed rotatable by the deceleration motor.

The rack 23 is installed horizontal being engaged with the pinion 22, and all the cultivation gutters 50 are normally positioned at the same height, since the intermediate portion of the rack is engaged with the pinion, the rack is intended to move leftward or rightward about the pinion along the rotation direction of the pinion.

At this time, the distance where the rack 23 moves leftward or rightward may be in proportion to the height that the cultivation gutters 50 hanging from the elevating member 40 which vertically ascends or descends by the moving member 30 by the driving of the deceleration motor 21 ascend and descend, as will be described later.

Therefore, even when the rack 23 moves in any direction by making the length of the rack 23 longer than the distance that it moves leftward or rightward, the gear teeth would not disengage from the engaged state with the pinion 22.

In addition, since the cultivation gutters 50 are formed long in the forward and backward directions, the pinion 22 and the rack 23, the moving member 30 and a plurality of the elevating members 40 are installed at the front and rear end positions of the cultivation utters in order for them to ascend or descend in the horizontal states, and since the driving force of the deceleration motor 21 is transferred to the pinion which is installed at the front and rear sides by the driving pipes 24, so the rack can move leftward or rightward simultaneously.

The moving member 30 may include a roller hanger 31, upper and lower rollers 32 and 32' and left and right moving pipes 33 and 33'.

The roller hanger 31 fixedly installs the top at the truss 12 at a predetermined interval, and upper and lower rollers 32 and 32' are axially installed at the bottom of the roller hanger.

In addition, the left and right moving pipes 33 and 33' are supported between the upper and lower rollers 32 and 32' while horizontally passing through, so the left and right moving pipes 33 and 33' can smoothly move leftward and rightward.

In addition, the left end and the right end of the rack 23 are fixedly inserted into the right end of the left moving pipe 33 and into the left end of the right moving pipe 33', and when the deceleration motor 21 is driven, the left and right moving pipes come to move simultaneously leftward and rightward by means of the rack in the rotation direction of the pinion 22.

The elevating member 40 may include a plurality of the hangers 41 and front and rear sprockets, pulleys 42 and 42', and elevating chains or wires 43 and 43'.

The hangers 41 are fixedly installed at the truss 12 at regular intervals, and the pulleys 42 and 42' of the front and rear sides are installed as a single shaft at each bottom and rotate.

In addition, the left and right moving pipes 33 and 33', which are supported by the upper and lower rollers 32 and 32' and move leftward and rightward pass over the tops of the sprockets of the front and rear sides of the hangers 41 positioned at the left and right sides of the truss 12 about the deceleration motor 21, and of the pulleys 42 and 42'.

The elevating chain or wire 32 fixedly binds a portion corresponding to the hanger 411 at the intermediate position and among one set formed of three neighboring hangers 41 to the left or right moving pipe 33 or 33' with the aid of a fixing clip 44, and a left part 43a arranged about the above fixedly bound portion hangs around downward through the left side of the sprocket or pulley 42' which is axially installed at the hanger 412 positioned at the left side of the hanger 411, and a right part 43b hangs around the right side of the sprocket or pulley axially installed at the hanger positioned at the right side of the hanger 411 and through the left side of the sprocket or pulley 42 axially installed at the hanger 411.

In the thusly hanging and installed state, when the left and right moving pipes 33 and 33' move rightward, since the elevating chain or wire is fixed at the left and right moving pipes by the fixing clip 44, they can move rightward simultaneously in the rightward direction, so the left part 43a is pulled and ascends, and the right part 43b descends, so the cultivation gutter 50 disposed at the left part ascends, and the cultivation gutter 50 disposed at the right part descends, and on the contrary, when the left and right moving pipes move leftward, the cultivation gutter disposed at the left part ascends, and the cultivation gutter disposed at the right part descends.

Meanwhile, when setting as one set the hanger 412 among the three hangers 411, 412 and 413 around which the elevating chain or wire 43 hangs and the other two hangers 41 which are in turn close to the left side, the elevating chain or wire 43' is intended to fixedly bind a portion corresponding to the hanger at the intermediate position of the direct left side of the hanger 412 of each set to the left or right moving pipes 33 or 33' using the fixing clip 44, and the left part arranged about the above fixedly bound portion hangs downward through the left side of the sprocket or pulley axially installed at the hanger positioned at the direct left side of the hanger at the intermediate position, and the right side hangs downward through the right side of the sprocket or pulley 42' axially installed at the hanger 412 and through the left side of the sprocket or pulley axially installed at the hanger at the intermediate position which corresponds to its direct left side.

However, when setting as one set the hanger 413 among the three hangers 411, 412 and 413 around which the elevating chain or wire 43 hangs and the other two hangers 41 which are in turn close to the right side thereof, the elevating chain or wire 43' fixedly binds the portion corresponding to the hanger of the intermediate portion which is the direct right side of the hanger 413 of each set to the left or right moving pipe 33 or 33' using the fixing clip 44, and the left part 43a arranged about the above fixedly bound portion hangs downward through the left part of the sprocket or pulley 42' axially installed at the hanger 413 positioned at the direct left side of the hanger at the intermediate position, and the right part 43b hangs downward through the right side of the sprocket or pulley 42 axially installed at the hanger positioned at the direct right side of the hanger at the intermediate position and through the left side of the sprocket or pulley axially installed at the hanger at the intermediate position which corresponds to its direct left side.

When the elevating chain or wire 43' hangs around in the above way, and the left and right moving pipes 33 and 33' move rightward, the elevating chain or wire is fixed at the left and right moving pipes using the fixing clip 44, they can move rightward simultaneously, so the left part 43a is pulled and ascends, and the right part 43b descends, and the cultivation gutter 50 disposed at the left part ascends, and the cultivation gutter 50 disposed at the right side descends, and on the contrary, when the left and right moving pipes move leftward, the cultivation gutter disposed at the left part ascends, and the cultivation gutter disposed at the right side descends.

The elevating chain or wire 43 or 43' hangs around the sprocket or pulley 42 or 42' of the front side and rear side by setting as one set three hangers 41. In this state, whenever the left and right moving pipes 33 and 33' move rightward or leftward, the cultivation gutters 50 can alternately ascend or descend in turn, so a passage through which workers can move may be made between the descended cultivation gutters by the ascended cultivation gutter.

The cultivation gutter 50 should be disposed in such a way that the left and right width is narrower than the front and rear length for the sake of easier cultivation work and elevating operation, and at the same time a horizontal state should be maintained between the left and right ends of the elevating chain or the wires 43 and 43'.

In addition, it is possible that the cultivation gutters 50 can be disposed in multiple stages, more than two stages, in such a way that the cultivation gutters 50 can be separated one on another at regular intervals.

Figure 8:
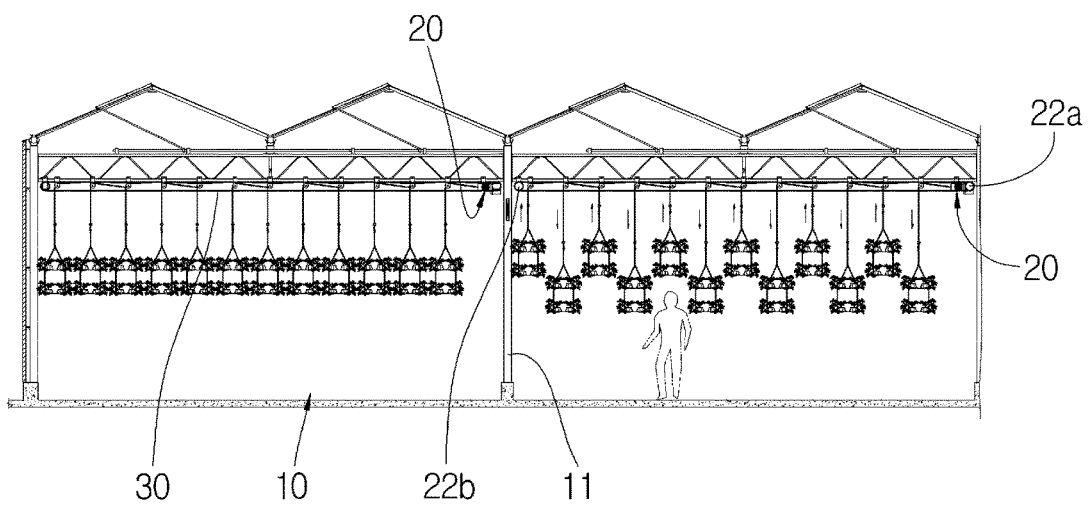
FIG. 8 is a schematic front view illustrating a greenhouse wherein an apparatus for mass cultivation of plants is installed according to a second exemplary embodiment of the present invention.
Figure 9:
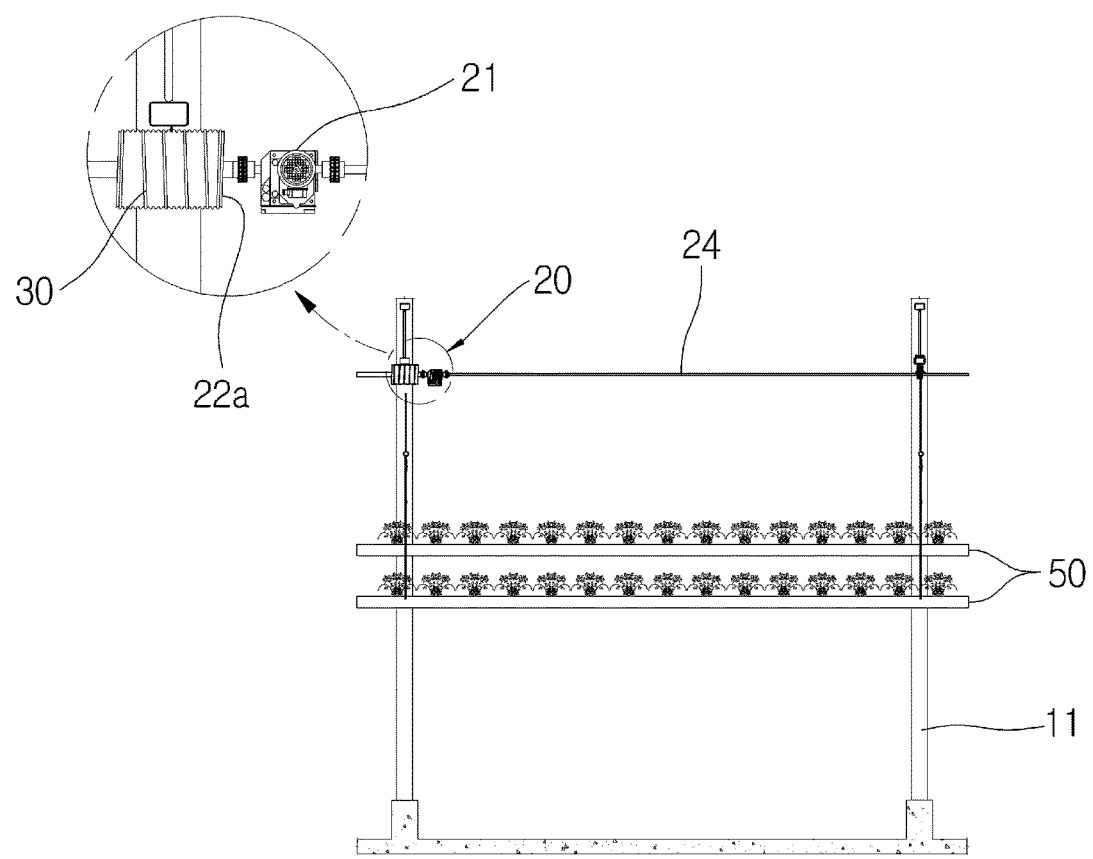
FIG. 9 is a side view illustrating a partially extracted and enlarged state when a cultivation gutter is in a horizontal state in FIG. 8.
Figure 10:
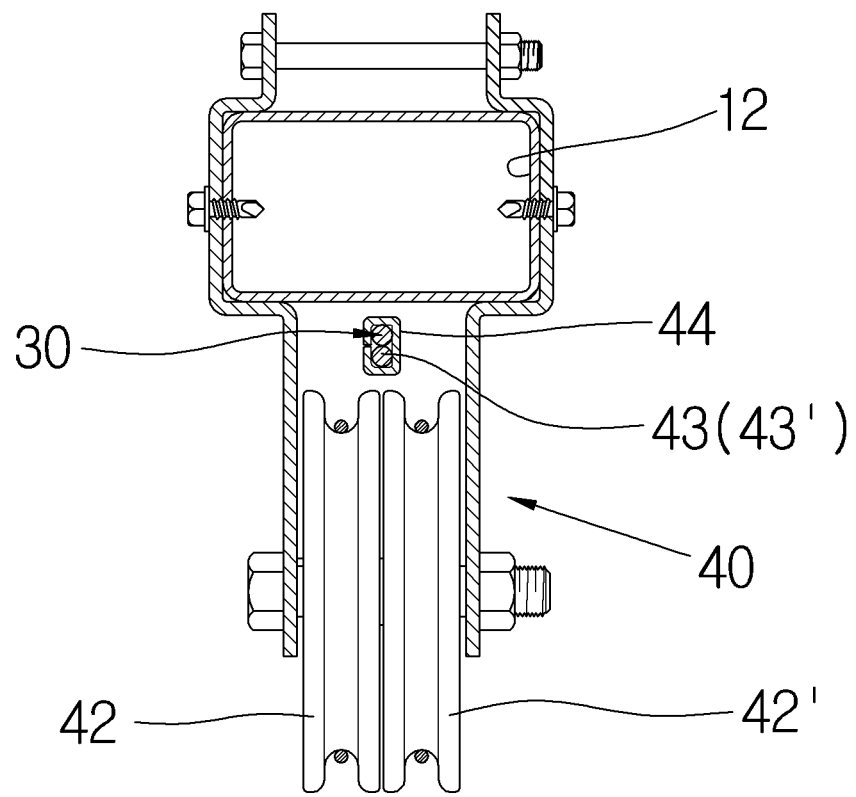
FIG. 10 is a side cross sectional view illustrating a partially extracted and enlarged state of a movement member and an elevating member in FIG. 8.

FIG. 7 is a schematic front view illustrating a greenhouse wherein an apparatus for mass cultivation of plants according to a second exemplary embodiment of the present invention, and FIG. 8 is a side view illustrating a partially extracted and enlarged state in FIG. 7, and FIG. 9 is a side view illustrating an extracted and enlarged stare of a moving member and an elevating member in FIG. 7.

The apparatus for mass cultivation of plants according to the second exemplary embodiment has the same configuration as the configuration which includes a driving unit 20 which is installed at a truss 12 horizontally crossing the tops of pillars 11 of a greenhouse 10, a moving member 30 which is installed horizontally crossing in left and right directions at the bottom of the truss and can move leftward or rightward by the driving unit, a plurality of elevating members 40 which can ascend or descend in response to the leftward and rightward movements of the moving member, and a plurality of cultivation gutters 50 which are disposed, hanging from the elevating member, provided that the components of the driving unit and the moving member differ from the configuration of the first exemplary embodiment.

More specifically, the driving unit 20 may include a deceleration motor 21 fixedly installed at the truss 12, a roller drum 22a which is installed rotatable by the deceleration motor, and a roller drum 22b which is axially installed at the opposite side of the truss while corresponding to the roller drum.

In addition, the moving member 30 may be formed of a wire which hangs and installed in such a way to circulate between the roller drums 22a and 22b by means of the rotations of the roller drums 22a and 22b.

In addition, the elevating chain or wire 43 and 43a' of the elevating member 40 fixedly binds, using the fixing clip 44, a corresponding portion to the upper portion of the moving member 30 which passes through the top of the hanger 41.

The apparatus for mass cultivation of plants according to a second exemplary embodiment of the present invention is characterized by the changes of the components from the pinion 22 and the rack 23 of the first exemplary embodiment to the roller drums 22a and 22b and from the left and right moving pipes 33 and 33' to the moving member 30 which is a wire, whereas the other configuration and operation are same as the first exemplary embodiment, so the detailed description thereof will be omitted.

The thusly constituted apparatus for mass cultivation of plants according to the first and second exemplary embodiments of the present invention can be installed multiple in number in the left and right widthwise direction as well as the front and rear lengthwise direction so as to use the entire area of the greenhouse 10 as the cultivation area. The operation thereof is as follows.

The cultivation gutters 50 are normally positioned horizontal at the same height in order for all the plants to uniformly receive sunshine, and when it needs to made a moving passage for workers at the time of seeding, cultivation work or harvest, the deceleration motor 21 is driven in the normal mode, and the left and right moving pipes 33 and 33' or the wire which is the moving member 30 is moved rightward.

In this state, the elevating chain or the wires 43 and 43' to which the left and right moving pipes 33 and 33' or the portion corresponding to the moving member 30 are bound through the fixing clip 44 moves together rightward, so the left parts 43a of the elevating chain or the wire ascends, and the right part 43b descends.

Therefore, the cultivation gutter 50 from the bottom of which the left part 43a hangs ascends, and the cultivation gutter 50 from the bottom of which the right part 43b hangs descends, thus making a passage between the cultivation gutters descended by the ascended cultivation gutter for the workers to pass through.

At this time, the height which the cultivation gutter 50 ascends is high enough for the workers to move in a standing posture without any problem, and the height which the cultivation gutter 50 descends is high enough for the workers to do seeding, cultivation work or harvest in a comfortable posture.

In addition, after the seeding, cultivation work or harvest is finished, the workers walk out of the greenhouse 10 and reversely drives the deceleration motor 21 so as to move leftward the left and right moving pipes 33 and 33' or the moving member 30.

In this way, the elevating chain or the wires 43 and 43' to which the left and right moving pipes 33 and 33' or the portion corresponding to the moving member 30 is bound through the fixing clip 44 moves together leftward, and the left part 43a of the elevating chain or the wire descends, and at the same time, the right part 43b ascends, so all the cultivation gutters 50 are positioned horizontal at the same height, thus allowing the plants to uniformly receive sunshine and grow well.

Meanwhile, it has been described in the first and second exemplary embodiments as examples that the elevating chain or wires 43 and 43' has hung around two sets in each set of which three hangers 41 are set as one set, however such examples are not limited thereto. In case where the hangers are set in two or more than two sets, it needs to increase the number of elevating chains or wires in proportion to the increasing sets.

Figure 11:
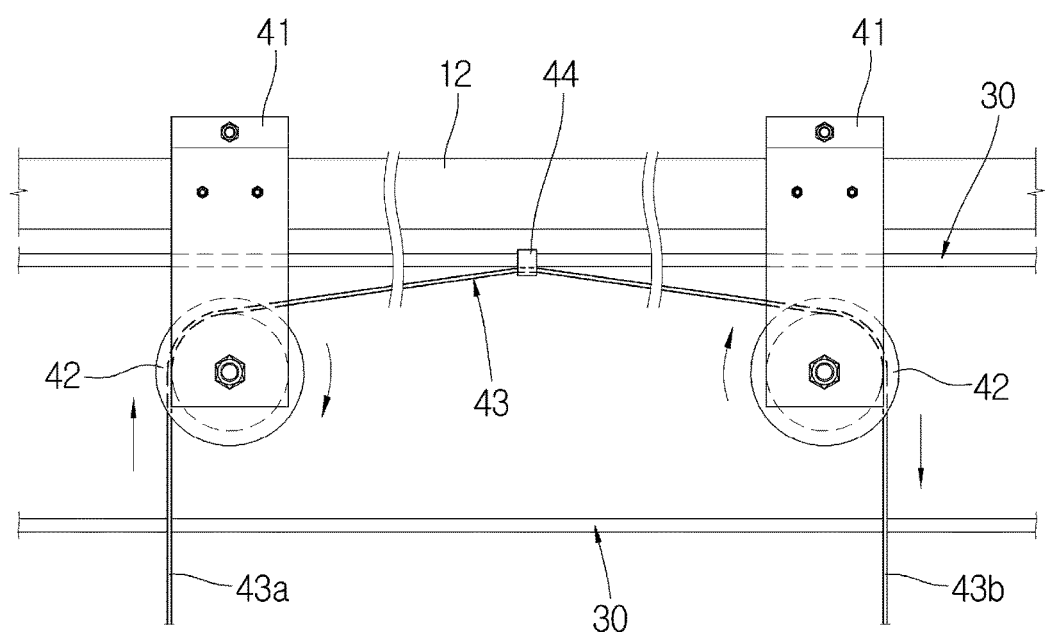
FIG. 11 is an enlarged front view illustrating another variant example of an elevating member which applies to an apparatus for mass cultivation of plants according to first and second exemplary embodiments of the present invention.

FIG. 11 is an enlarged front view illustrating another variant of an elevating member which applies to the apparatus for mass cultivation of plants according to the first and second exemplary embodiments of the present invention.

The elevating member 40 according to another variant is characterized by the configuration wherein the neighboring hangers among the multiple hangers 41 fixedly installed at regular intervals at the truss in such a way that the left and right moving pipes 33 and 33' or the moving member, which is a wire, can pass over the tops are set as one set, and the elevating chain or the wire 43 hangs around each set. Except for the above configuration, other configurations and operations are same as the first and second exemplary embodiments, so the detailed description will be omitted.

When two hangers 41 are set as one set, and the elevating chain or wire 43 hangs around the left or right moving pipe 33 or 33' or the moving member 30, which is a wire, passing through the hangers of each set, the portion of the elevating chain or wire corresponding to the intermediate portion of the left or right moving pipe or of each set of the moving member, which is a wire, is fixedly bound with the fixing clip 44, and the left part 43a where the cultivation gutter 50 is disposed at the bottom arranged about the fixedly bounded portion hangs downward through the left side of the sprocket or pulley 42 of the hanger which is positioned at the left side among the hangers, and the right part 43b where the cultivation gutter is disposed at the bottom hangs downward through the right side of the sprocket or pulley of the hanger which is positioned at the right side.

In this way, when the left or right moving pipe 33 or 33' or the moving member 30, which is a wire, moves rightward in the driving direction of the driving motor 21, the elevating chain or wire 43 moves rightward, so the cultivation gutter 50 disposed at the left part 43a ascends, and the cultivation gutter disposed at the right part 43b descends.

Figure 12A:
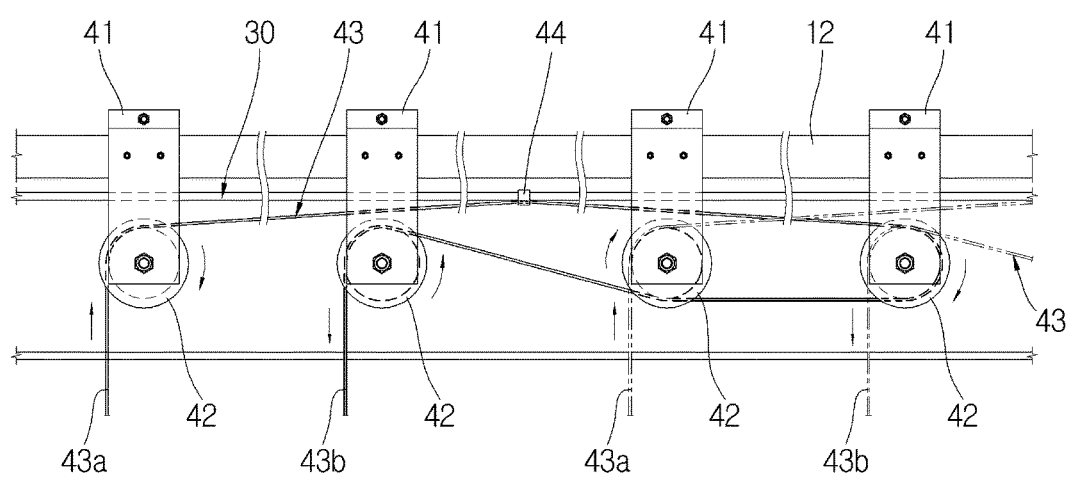
FIG. 12A is an enlarged front view illustrating another variant example of an elevating member which applies to an apparatus for mass cultivation of plants according to first and second exemplary embodiments of the present invention.
Figure 12B:
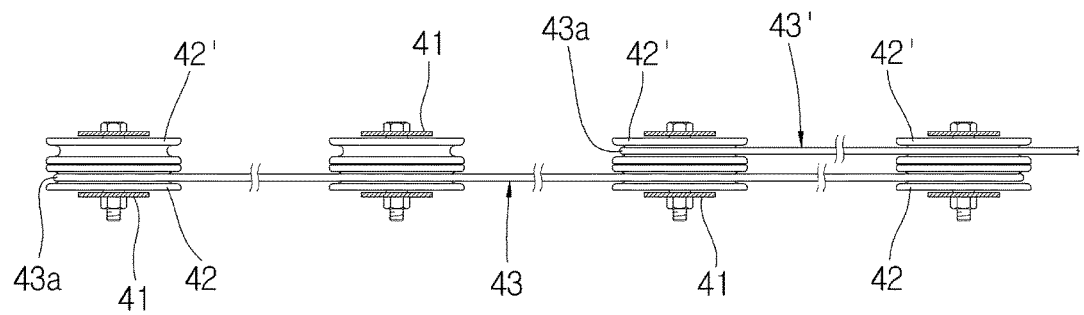
FIG. 12B is a plane view illustrating a partially extracted state of an elevating member in FIG. 12A.

FIG. 12 is an enlarged front view illustrating another variant of the elevating member which applies to the apparatus for mass cultivation of plants according to the first and second exemplary embodiments of the present invention, and FIG. 12B is a plane view illustrating a partially extracted state of the elevating member in FIG. 12A.

The elevating members 40 according to another variant may be fixedly installed at regular intervals at the truss in order for the left and right moving pipes 33 and 33' and the moving member 30, which is a wire, to pass over the tops, and the elevating chain or wire 43 hangs around each set wherein the 4 neighboring hangers among the multiple hangers 41 are set as one set, wherein the sprocket or pulley 42 and 42' of the front and rear sides are installed on a single shaft, and except for the above configuration, other configurations and operations are same as the first and second exemplary embodiments, so the detailed description will be omitted.

When hanging the elevating chain or wire 43 around each set wherein the four hangers 41 are set as one set, the portion of the elevating chain or wire corresponding to the intermediate position of the second and third hangers when viewing from the left side among the four hangers of the left or right moving pipe 33 or 33' or the moving member 30, which is a wire, passing through the hangers of each set is fixedly bound with the fixing clip 44.

In addition, the left part 43a where the cultivation gutter 50 is disposed at the bottom formed about the fixedly bound portion of the elevating chain or wire 43 hangs downward through the left side of the sprocket or pulley 42 of the first hanger 41 when viewing from the left side, and the right part 43b where the cultivation gutter is disposed at the bottom hangs downward through the right side and the bottom of the sprocket or pulley 42 of the fourth hanger 41 when viewing from the left side and through the bottom of the sprocket or pulley 42 of the third hanger 41 and through the top and left side of the sprocket or pulley 42 of the second hanger 41.

In addition, when setting as one set the third and fourth hangers among the four hangers 41 around which the elevating chain or wire 43 hangs, and the two neighboring hangers, the portion of the elevating chain or wire 43' corresponding to the intermediate position of the fourth hanger 41 of the left or right moving pipe 33 or 33' and the moving member 30 which pass though the above hangers and the fifth hanger 41 of the direct right side is fixedly bound, and the left part 43a where the cultivation gutter 50 is disposed at the bottom formed about the fixedly bound portion hangs downward through the left side of the sprocket or pulley 42' of the third hanger 41, and the right part 43b where the cultivation gutter is disposed at the bottom is bound downward, hangs downward through the right side and bottom of the sprocket or pulley 42' of the sixth hanger 41 of the direct right side of the fifth hanger 41 and through the bottom of the sprocket or pulley 42' of the fifth hanger 41 and through the top and left side of the sprocket or pulley 42' of the fourth hanger 41.

When the elevating chain or wire 43 or 43' is installed at each set in the above way, the cultivation gutter 50 disposed at the left and right parts 43a and 43b of each set are positioned horizontal at the same heights.

In this state, when the left or right moving pipe 33 or 33' or the moving member 30, which is a wire, moves rightward in response to the driving direction of the driving motor 21, since the elevating chain or wire 43 or 43' of the front and rear sides move rightward simultaneously, the cultivation gutter 50 disposed at the left part 43a of each set ascends, and the cultivation gutter 50 disposed at the right part 43b descends, so a passage can be formed between the ascended and descended cultivation gutters of each set, and thereafter when the right moving pipe or the moving member, which is a wire, moves leftward and return to its original position, the cultivation gutter disposed at the left part descends, and the cultivation gutter disposed at the right part ascends and is positioned horizontal at the same height.

Meanwhile, in the first and second exemplary embodiments, it has been described that when the cultivation gutter 50 disposed at the left part 43a of each set ascends, and the cultivation gutter 50 disposed at the right part 43b descends, thus forming a passage, and when the cultivation gutter disposed at the left part descends, each cultivation gutter stops horizontal at the same heights, however the above descriptions are not limited thereto. On the contrary, when the cultivation gutter disposed at the left part descends, the cultivation gutter disposed at the right part may ascend, thus forming a passage, and when the cultivation gutter disposed at the left part ascends, the cultivation gutter disposed at the right part may descend, so each cultivation gutter may stop horizontal at the same height.

In addition, since the cultivation gutters 50 are disposed at the left and right parts 43a and 43b of the elevating chain or wire 43 or 43' of the front and rear sides, the elevating chain or wire of the front and rear sides may reliably ascend or descend the aid of their weights without disengaging from the sprocket or pulley 42 and 42' when the left or right moving pipe 33 or 33' or the moving member 30 moves.

The apparatus for mass cultivations of plants according to the first and second exemplary embodiments of the present invention which operates in the above manner can use all the area of the greenhouse 10 as a cultivation area, thus doubling the amount of harvest.

INDUSTRIAL APPLICABILITY

The industrial applicability of the present invention is present in the detailed descriptions of the invention.

The invention claimed is:
1. An apparatus for mass cultivation of plants, comprising:
a driver installed on a truss horizontally crossing a top of a greenhouse;
a moving member installed at a bottom of the truss, wherein the moving direction of the moving member changes in accordance with a driving direction of the driver;
a plurality of elevating members installed at regular intervals at the bottom of the truss in such a way that when a left part of each elevating member ascends by the moving member, a right part of the corresponding elevating member descends, and when the left part descends, the right part of the elevating member ascends; and
a plurality of cultivation gutters disposed to hang from bottoms of the left part and the right part of each elevating member,
wherein the driver includes:
a deceleration motor fixedly installed at the truss; and
a pinion installed to be rotated by the deceleration motor, wherein the moving member includes:
a rack installed to horizontally engage the pinion;
a left moving pipe installed and supported and configured to fixedly insert a left end of the rack into a right end of the left moving pipe; and
a right moving pipe installed and supported and configured to fixedly insert a right end of the rack into a left end of the right moving pipe;
wherein the truss includes:
a plurality of roller hangers fixedly installed at predetermined positions of the truss;
wherein each roller hanger includes:
upper and lower rollers axially installed at each bottom of each roller hanger;
a plurality of non-roller hangers fixedly installed at regular intervals at the truss in order for the left and right moving pipes to pass over tops of each non-roller hanger;

a sprocket or pulley axially installed at each bottom of each roller and non-roller hanger;
wherein the left moving pipe horizontally passes between the upper and lower rollers; and
the right moving pipe horizontally passes between the upper and lower rollers; and
each elevating member includes:
an elevating chain or wire;
wherein each elevating member is connected to at least a roller and non-roller hanger, and ascends and descends as the moving member moves.

2. An apparatus for mass cultivation of plants, comprising:
a driver installed on a truss horizontally crossing a top of a greenhouse;
a moving member installed at a bottom of the truss, wherein the moving direction of the moving member changes in accordance with a driving direction of the driver;
a plurality of elevating members installed at regular intervals at the bottom of the truss in such a way that when a left part of each elevating member ascends by the moving member, a right part of the corresponding elevating member descends, and when the left part descends, the right part of the elevating member ascends; and
a plurality of cultivation gutters disposed to hang from bottoms of the left part and the right part of each elevating member,
wherein the driver includes:
a deceleration motor fixedly installed at the truss; and
a pinion installed to be rotated by the deceleration motor, wherein the moving member includes:
a rack installed to horizontally engage with the pinion;
left moving pipe installed and supported and configured to fixedly insert a left end of the rack into a right end of the left moving pipe; and
a right moving pipe installed and supported and configured to fixedly insert a right end of the rack into a left end of the right moving pipe;
wherein the truss includes:
a plurality of roller hangers fixedly installed at a predetermined position of the truss;
wherein each roller hanger includes:
upper and lower rollers axially installed at each bottom of each roller hanger;
the left moving pipe horizontally passes between the upper and lower rollers; and
the right moving pipe horizontally passes between the upper and lower rollers;
a plurality of non-roller hangers fixedly installed at regular intervals at the truss in order for the left and right moving pipes to pass over tops; and
a sprocket or pulley axially installed at each bottom of each roller and non-roller hanger.

3. An apparatus for mass cultivation of plants, comprising:
a driver installed on a truss horizontally crossing a top of a greenhouse;
a moving member installed at a bottom of the truss, wherein the moving direction of the moving member changes in accordance with a driving direction of the driver;
a plurality of elevating members installed at regular intervals at the bottom of the truss in such a way that when a left part of the elevating member ascends by the moving member, a right part of the corresponding elevating member descends, and when the left part descends, the right part of the elevating member ascends; and
a plurality of cultivation gutters disposed to hang from bottoms of the left part and the right part of each elevating member,
wherein the driver includes:
a deceleration motor fixedly installed at the truss; and
a pinion installed to be rotated by the deceleration motor, wherein the moving member includes:
a rack installed to horizontally engage with the pinion;
a left moving pipe installed and supported and configured to fixedly insert a left end of the rack into a right end of the left moving pipe; and
a right moving pipe installed and supported and configured to fixedly insert a right end of the rack into a left end of the right moving pipe;
wherein the truss includes:
a plurality of roller hangers fixedly installed at a predetermined position on the truss;
wherein each roller hanger includes:
upper and lower rollers axially installed at each bottom of each roller hanger;
a plurality of non-roller hangers fixedly installed at regular intervals at the truss in order for the left and right moving pipes to pass over tops of each non-roller hanger;
a sprocket or pulley axially installed at each bottom of each roller and non-roller hanger;
wherein the left moving pipe horizontally passes between the upper and lower rollers; and
the right moving pipe horizontally passes between the upper and lower rollers; and
each elevating member includes:
an elevating chain or wire.

4. An apparatus for mass cultivation of plants, comprising:
a driver installed on a truss horizontally crossing a top of a greenhouse;
a moving member installed at a bottom of the truss, wherein the moving direction of the moving member changes in accordance with a driving direction of the driver;
a plurality of elevating members installed at regular intervals at a bottom of the truss in such a way that when a left part of each elevating member ascends by the moving member, a right part of the corresponding elevating member descends, and when the left part descends, the right part of the elevating member ascends; and
a plurality of cultivation gutters disposed to hang from bottoms of the left part and the right part of each elevating member,
wherein the driver includes:
a deceleration motor fixedly installed at the truss; and
a pinion installed to be rotated by the deceleration motor, wherein the moving member includes:
a rack installed to horizontally engage the pinion ;
a left moving pipe installed and supported and configured to fixedly insert a left end of the rack into a right end of the left moving pipe; and
a right moving pipe installed and supported and configured to fixedly insert a right end of the rack into a left end of the right moving pipe;
wherein the truss includes:
a plurality of roller hangers fixedly installed at predetermined positions of the truss;

wherein each roller hanger includes:
  upper and lower rollers which are axially installed at each bottom of each roller hanger;
  the right moving pipe horizontally passes between the upper and lower rollers; and
  a plurality of non-roller hangers fixedly installed at the truss in order for the left and right moving pipes to pass over a top; and
  a sprocket or pulley axially installed at each bottom of each roller and non-roller hanger.

5. The apparatus of claim 2, wherein when the moving member moves rightward, the cultivation gutter disposed at the left part of each elevating member ascends, and the cultivation gutter disposed at the right part of the corresponding elevating member descends, thus forming a passage between the ascended and descended cultivation gutters, and when the moving member moves leftward and returns to its original position, the cultivation gutter disposed at the left part descends, and the cultivation gutter disposed at the right part of the elevating member ascends, so they can be installed horizontal at the same heights.

6. The apparatus of claim 5, wherein the cultivation gutters are disposed in two, or more than two, multiple layers one on another, with a predetermined space in between.

7. The apparatus of claim 3, wherein when the moving member moves rightward, the cultivation gutter disposed at the left part of each elevating member ascends, and the cultivation gutter disposed at the right part of the corresponding elevating member descends, thus forming a passage between the ascended and descended cultivation gutters, and when the moving member moves leftward and returns to its original position, the cultivation gutter disposed at the left part descends, and the cultivation gutter disposed at the right part of the elevating member ascends, so they can be installed horizontal at the same heights.

8. The apparatus of claim 7, wherein the cultivation gutters are disposed at two or more than two multiple layers one on another with a predetermined space between them.

9. The apparatus of claim 4, wherein when the moving member moves rightward, the cultivation gutter disposed at the left part ascends, and the cultivation gutter disposed at the right part descends, thus forming a passage between the ascended and descended cultivation gutters, and when the moving member moves leftward and returns to its original position, the cultivation gutter disposed at the left part descends, and the cultivation gutter disposed at the right part ascends, so they can be installed horizontal at the same heights.

10. The apparatus of claim 9, wherein the cultivation gutters are disposed at two or more than two multiple layers one on another with a predetermined space between them.

* * * * *